United States Patent [19]

von der Heide et al.

[11] 4,376,261
[45] Mar. 8, 1983

[54] TWO-PULSE BRUSHLESS D.C. MOTOR

[75] Inventors: Johann von der Heide, Mönchweiler; Rolf Müller; Benno Doemen, both of St. Georgen, all of Fed. Rep. of Germany

[73] Assignee: Papst-Motoren KG, St. Georgen, Fed. Rep. of Germany

[21] Appl. No.: 210,409

[22] Filed: Nov. 25, 1980

[30] Foreign Application Priority Data

Nov. 30, 1979 [CH] Switzerland .................. 10772/79

[51] Int. Cl.³ ............................................. H02K 29/02
[52] U.S. Cl. ..................................... 318/254; 318/138
[58] Field of Search .................... 318/138, 254, 254 A

[56] References Cited

U.S. PATENT DOCUMENTS 4,030,005 6/1977 Doemen .............................. 318/138
4,070,606 1/1978 Morozumi et al. .
4,230,976 10/1980 Müller .................................. 318/138

FOREIGN PATENT DOCUMENTS 2639055 3/1977 Fed. Rep. of Germany .

OTHER PUBLICATIONS

Manera, A. S., Solid State Electronic Circuits: for Engineering Technology, McGraw-Hill Book Company, N.Y., 1973, pp. 693-700.

Primary Examiner—J. V. Truhe
Assistant Examiner—S. M. Bergmann
Attorney, Agent, or Firm—Frishauf, Holtz, Goodman & Woodward

[57] ABSTRACT

In response to a Hall-IC sensor exposed to the magnetic field of the rotor of a brushless d.c. motor, two interleaved sequences of pulses are generated at separate outputs with an interpulse pause of a certain length occurring between successive interleaved pulses to prevent reduction of efficiency and increase of motor noise that would result from overlapping pulses being supplied to the stator of the motor. When these pulses are utilized to switch a semiconductor full bridge circuit, through which a single winding of the stator is energized by current pulses alternating in direction, prevention of short-circuits resulting from slow turn-off of the semiconductor switches is prevented. For overcurrent protection, only half of the bridge is intermittently blocked by a current regulator when the current reaches a predetermined limiting value, this provision also reducing generation of noise and interference by the motor.

17 Claims, 8 Drawing Figures

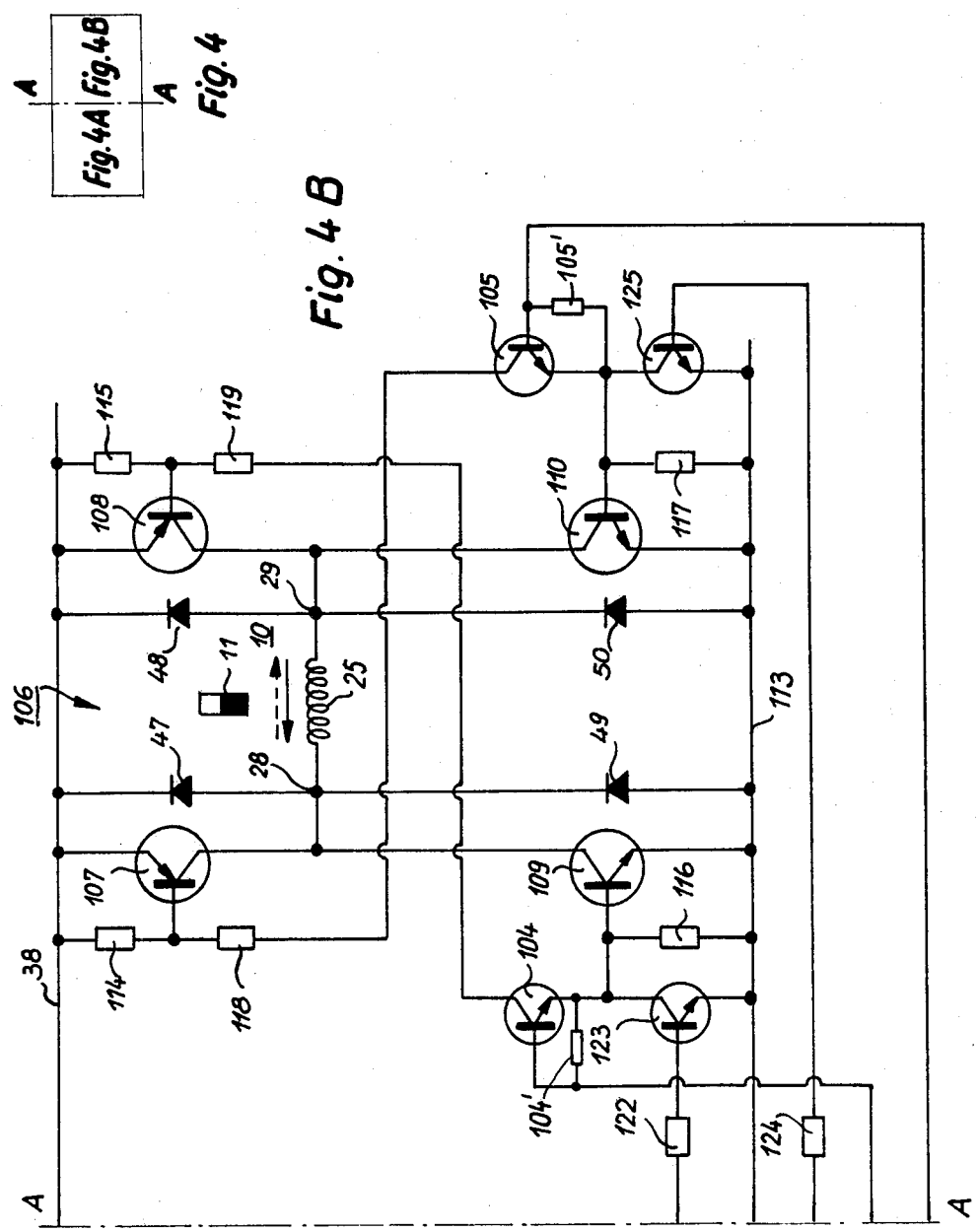

TWO-PULSE BRUSHLESS D.C. MOTOR

The invention concerns a brushless d.c. motor of the two-pulse per 360° el.-rotation-type having a winding or a pair of windings for energizing the stator and a permanent magnet rotor. In each 360° el. of rotation, there are two pulses oppositely energizing the stator. These may be one pulse through each winding if there are two windings, or a pulse in each direction through a single winding. The latter is of particular interest, although the invention is not limited thereto. The preferred field of application for the invention is that of motors having a power rating from about 10 watts up.

Both a single winding (monofilar) and double winding 2 pulse motors are disclosed in U.S. Pat. No. 4,030,005. In known motors, difficulty is sometimes experienced because the interpulse interval is not long enough to allow one pulse to terminate fully before the next one begins.

It is important in two-pulse motors that the successive stator pulses should not mutually overlap in time. Such separation in time of the stator pulses on the one hand improves the efficiency and on the other hand reduces the noise output. In the case of brushless d.c. motors with a single winding switched by a bridge circuit, moreover, the non-overlap of successive pulses is important in order to prevent short-circuits in the bridge circuit. Such short-circuits would quickly destroy the semiconductor elements of the bridge circuit.

THE INVENTION

It is an object of the present invention to provide a brushless d.c. motor of the two-pulse per 360° el.-rotation-type in which a no-current interval is provided between successive pulses and in which this provision is achieved with simple means.

Briefly, two interleaved sequences of pulses of the same frequency, which are synchronous with the revolution of the rotor, are generated in such a way that one of the pulse sequences is offset in phase from the other by a fraction of the pulse length which is preferably in the neighborhood of half the pulse period of the particular sequence. The relatively offset pulse sequences so generated are then converted by logic circuits to provide two interleaved pulse sequences where every pulse of either sequence is spaced in time from the preceding and succeeding pulses of the other sequence by a distinct interpulse interval. The pulses of one of these sequences provided by the logic circuit are used to control current pulses in one direction in the stator, and the pulses of the other sequence are used to control pulses in the other direction.

A motor is thereby produced that has favorable properties that are particularly suitable for the operation of fans and blowers at relatively high power, i.e. from 10 watts upwards.

The time offset of the pulses furnished to the logic circuit is conveniently provided by a delay circuit and the delay circuit which is preferred is the Miller integrator. The conjunctive correlation devices (gates) of the logic circuit typically provide rectangular output pulses. It is desirable in such cases to provide current limiting of the pulses through the stator windings, and in the case of a winding driven through a bridge circuit, it is particularly useful for the current limiting to be produced by an on-off current limiter operating on only one half of the bridge circuit. In such a case, the semiconductor switches of the bridge circuit must have a reverse current bypass diode across each of them, so that current in the windings can be switched off quickly with a minimum generation of noise and disturbances. In this manner, particularly in starting up, the occurrence of high motor currents and the related problems of overloading of the stator winding or of the power semiconductors of the bridge circuit are avoided.

BRIEF DESCRIPTION OF THE DRAWINGS

The invention is further described by way of illustrative examples, with reference to the annexed drawings, in which:

FIG. 4 is a more detailed circuit diagram showing how FIG. 4A and FIG. 4B go together to illustrate a preferred embodiment of the invention;

FIG. 4B is the driver, bridge and stator winding portion of the preferred embodiment of the invention illustrated in FIG. 4 and FIG. 4A;

DESCRIPTION OF THE ILLUSTRATED EMBODIMENTS

Figure 1:
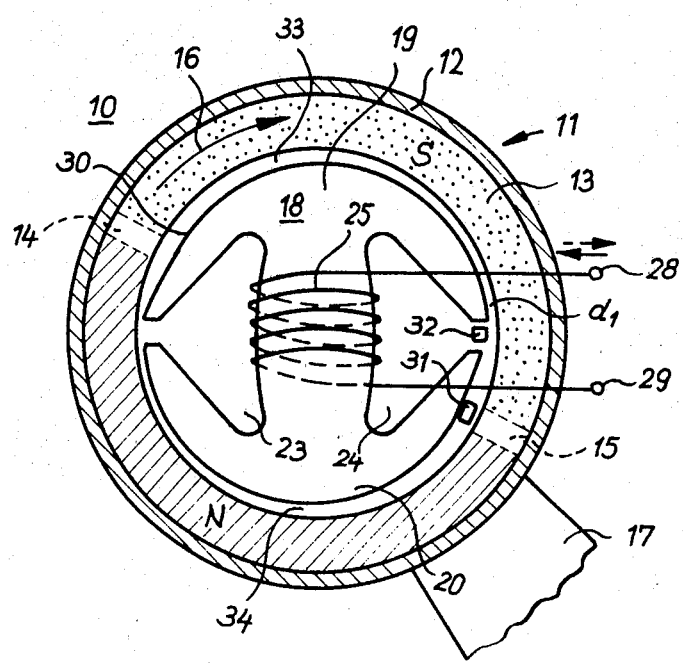
FIG. 1 is a diagrammatic representation of the rotor and stator structures of a two-pulse brushless d.c. motor with auxiliary torque provided by magnetic reluctance, this structure of motor being in itself known.

FIG. 1 shows diagrammatically a brushless d.c. motor 10 of the two-pulses per 360° el.-rotation-type, here a monofilar two-pole motor such as is known from the previously mentioned U.S. Pat. No. 4,030,005. The single winding of the stator is supplied during a full revolution of the rotor with only two current pulses of about the same length, one of them flowing through the stator winding 25 in one direction and the other flowing through the winding in the other direction. Such a motor may also be described as a single phase motor.

The rotor 11 has two poles, which results in the designation of the motor as a two-pole motor. It should be noted that the present invention is equally applicable for motors with a higher number of poles, for example four-pole, six-pole, etc., motors, as well as for two-winding two-pulse motors, these variations also being shown, apart from the present invention, in U.S. Pat. No. 4,030,005.

The motor illustrated in FIG. 1 is an external rotor motor 10 with a two-pole external rotor 11 of which the radial magnetization of the permanent magnets carried by it is indicated in the conventional way by the symbols N and S. This magnetization is of trapeze shape with narrow gaps 14 and 15 (about 5° to 20° electrical) provided between the poles. The trapezoidal magnetization provides a practically constant induction, in each case over 170° to 175° (electrical) and thereafter a monotonic decrease of magnetization, a type of magnetization that is explained in German (Fed. Rep.) Pat. No. 2 346 380 of the assignee of the present invention.

The rotor 11 has a circumferential part 12, which may for example be a deep-drawn pot or cup of steel, the bottom (not shown) of which is connected with the shaft (not shown) of the rotor. In this cup 12, the actual magnet 13 is affixed, usually a so-called rubber magnet. Fan blades 17 of a fan are welded to the cup 12, so that they will be driven by the motor 10. Only one fan blade 17 is shown in FIG. 1.

The locations of practically constant induction (i.e. practically constant magnetic flux density) for the north pole of the rotor are shown in FIG. 1 by diagonal shading and for the south pole by speckling with dots. The direction of rotation is designated at 16.

The stator 18 has two salient poles, an upper pole 19 and a lower pole 20, which enclose between their respective wings the slots 23 and 24 through which the winding 25 is wound. The winding 25 has connection terminals 28 and 29. A first rotor position sensor 32 is located at the opening of the slot 24, and a second rotor position sensor 31 at a location at a distance of about 25° in the direction of rotation. Both sensors 31 and 32 are galvanomagnetic sensors, for example Hall-ICs, which are Hall generators equipped with auxiliary components to amplify and/or stabilize the output. These sensors provide identical signals, as shown in lines A and B of FIG. 3, from which it is evident that the signals of the respective sensors are offset from each other by an angle $\alpha$, or rather by a period of time corresponding to the rotational angle $\alpha$.

The air gap 33 above the stator pole 19 and the air gap 34 of the same shape for the pole 20 are shaped in the manner shown in the previously mentioned U.S. Pat. No. 4,030,005. For example, starting from the opening of the slot 23, the air gap 33 increases in the direction of rotation up to a maximum 30 and from there on decreases monotonically down to a minimum $d_1$. The desired reluctance torque is produced in this manner (compare in this respect the previously mentioned German Pat. No. 2 346 380).

It is evident that a motor according to the invention can similarly be constituted as an internal rotor motor. The air gap shade depends upon the shape of the desired reluctance moment and the pattern of magnetization of the rotor 11. The pole gaps 14 and 15 of the rotor can advantageously be skewed (with respect to the axial direction).

As already explained, d.c. current pulses flow alternately in the winding 25 from the terminal 28 to the terminal 29 and from the terminal 29 to the terminal 28. Between each pair of successive pulses, now, there must be an interval of no current.

Figure 2:
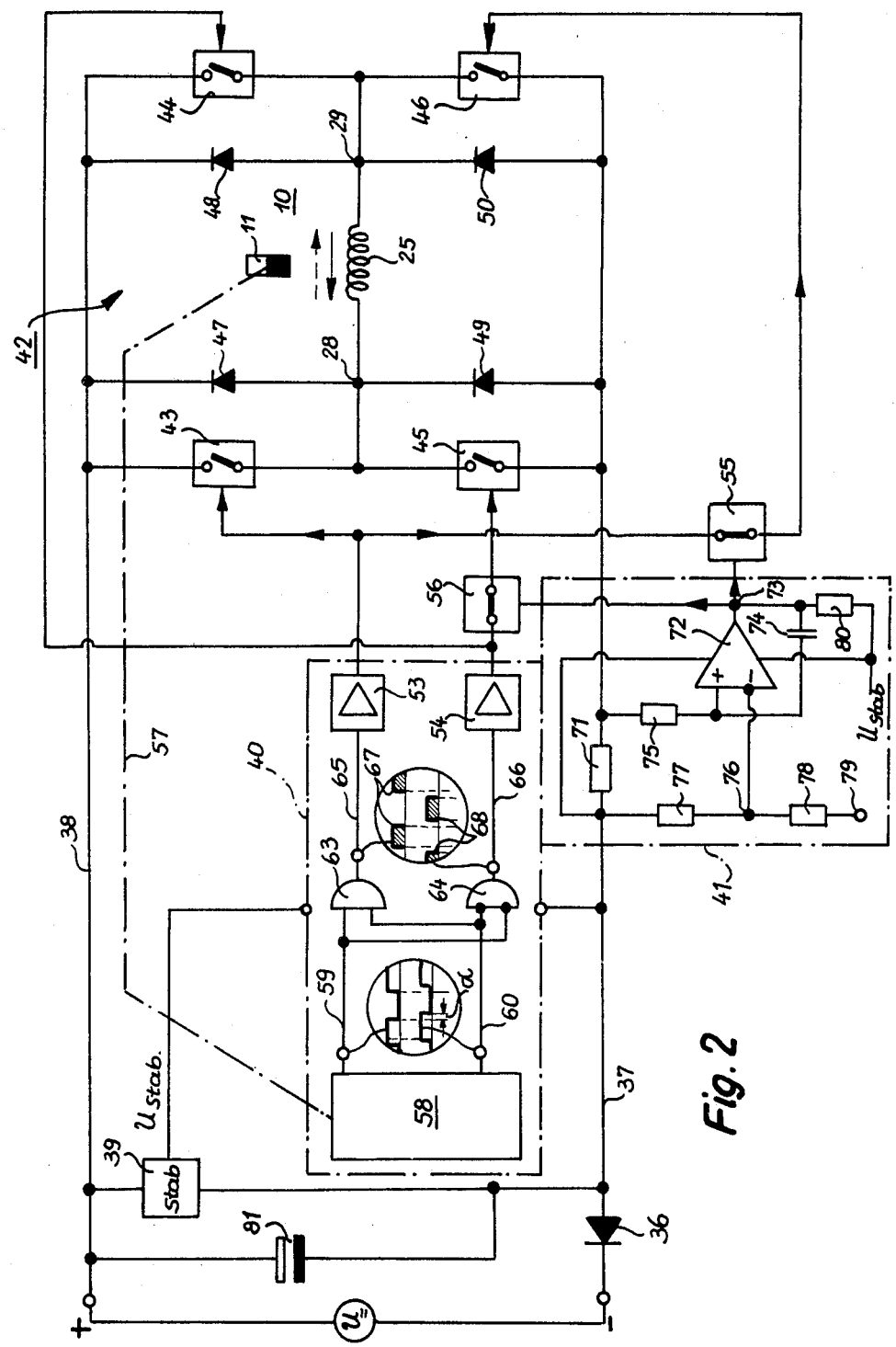
FIG. 2 is a circuit diagram partly in block form of an illustrative embodiment of the invention.

FIG. 2 shows a circuit, partly in block form, that meets the requirement just mentioned.

An operating voltage source $U_=$, for example the battery of the vehicle or of a telephone central office, has a voltage that usually lies between 12 and 110 volts. At its negative pole, a negative supply lead 37 is connected through a protective diode 36 providing security against false polarity connections, and the positive pole of the battery is connected to a positive supply lead 38.

All of the electronic control apparatus of the motor 10, namely the circuits for commutation of the stator current and for its limitation, is supplied by a voltage regulation circuit 39 that delivers a stabilized low output voltage $U_{stab}$ of a magnitude of, for example, 5 volts. This provision had the advantage that the commutation circuit unit designated 40 in FIG. 2 and the current regulation circuit unit designated 41 in FIG. 2 can be utilized for motors of various different operating voltages, so that different motor types can be equipped for operation with a minimum of electronic component types. These components 40 and 41 are connected as shown to $U_{stab}$ and control the bridge circuit of the motor 10 to which the full operating voltage is applied. This of course requires quite specifically designing the bridge circuit. This possibility of utilizing circuit units of a standard design for a series of products stands in contrast, for example, to FIGS. 2 or 3 of the patent application of the assignee of the present invention, Ser. No. 040,276 of July 24, 1980, where the problem of interfacing unitary electronic control systems with different types of power sections had not been solved.

In the circuit diagram of FIG. 2, only the winding 25 and the rotor 11 of the motor 10 are shown. The winding is driven by a full bridge circuit 42 which is constituted by four semiconductor switches 43,44,45 and 46 (which may e.g. be power transistors), in parallel with each of which a reverse current bypass diode 47,48,49,50 is connected. In operation, first the semiconductor switches 43 and 46 are closed and then the semiconductor switches 44 and 45, and so on in alternation. The semiconductor switches that are operated together are always at opposite sides of the bridge (these transistors are diagonally opposite each other in FIG. FIG. 2). The driver element 53 controls the semiconductor switches 43 and 46 and the driver 54 controls the semiconductor switches 44 and 45. A control device 55, which may be a switch, that is actuatable by the current regulator 43, is interposed in the connection from the drive element 53 to the semiconductor switch 46 and likewise a control element 56, likewise actuatable by the current regulator 43, is interposed in the connection from the driver 54 to the semiconductor switch 45. When the current regulator 43 operates, it blocks the current path of the control elements 55 and 56 to block passage of control pulses to the semiconductor switches 45 and 46 of the lower bridge half or section, so that the motor winding 25 receives no more current from outside of it, and the motor current correspondingly falls off. It is to be noted here that the blocking of only one half of the bridge is a great advantage, because the winding in the resulting free-running state is not reversed in polarity, but only short-circuited. In consequence, the falling off of current is slower and the alternating current components across the winding are only half as great as in case of a blocking of the entire bridge. There accordingly appear at the winding 25, upon the operation of the current regulator 43 (which operates as an on-off regulator) not rectangular voltage signals of twice the operating voltage, but only signals of the amplitude of the operating voltage. This signifies that there are lower iron losses and lower disturbance voltages. The outputs of the driver elements 53 and 54 are not short-circuited, but rather continue to actuate the semiconductor switches 43 and 44.

Figure 3:
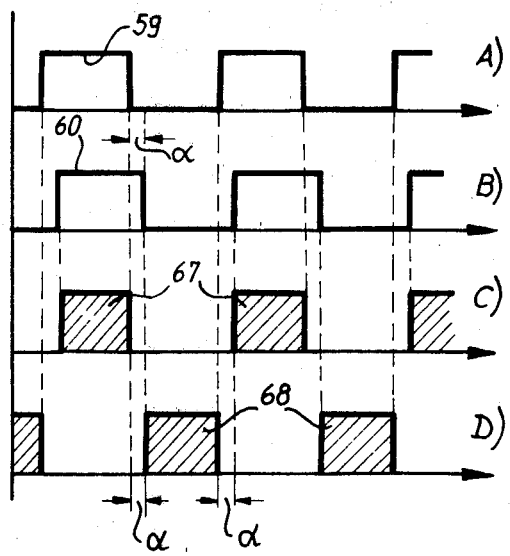
FIG. 3, which appears on the same sheet as FIG. 1, is a timing diagram explaining the operation of FIG. 2.

The commutation unit 40 includes a rotor position sensor device 58 operated by the rotor 11 (as symbolized by the chain-dotted line 57). This sensor device 58 may for example be constituted by the two galvanomagnetic sensors 31 and 32 of FIG. 1 that provide their respective output rectangular pulses with a keying ratio m of about 50% (i.e. these pulses are about the same length as the intervals between them). FIG. 3 shows in lines A and B the pulses at the outputs 59 and 60 of the sensor apparatus 58. These pulses are substantially identical in shape, but offset with respect to each other by the angle $\alpha$.

These pulses are then supplied to two conjunctive logic members, in this case an AND-gate 63 and a NAND-gate 64, which respectively produce at their outputs 65 and 66 the control pulses 67 and 68 that are spaced from each other by intervals of the duration corresponding to the angle α. In this manner, the result is obtained that the current in the winding 25 in one direction has always died away before the current in the other direction sets in. This means that one pair of semiconductor switches are extinguished before the other pair is fired when these switches are SCRs.

The pulses 67 and 68 are essentially digital pulses which completely turn on the semiconductor switches 43 ... 46. Because of the low internal resistance of the winding 25, excessively high currents could flow in this winding in the starting-up process, as long as the counter-EMF is not yet sufficiently large. The current regulator 41 prevents such overcurrents upon starting up and also in operation, for example, if the rotor 11 should be braked by a mechanical obstruction or even blocked.

The measuring resistance 71 of e.g. 0.1 ohm is interposed between the diode 36 and the bridge circuit 42 for measuring the current in the motor 10. The voltage drop across the resistance 71 is supplied to the two inputs of an operational amplifier 72 of which the output signal of the output 73 is fed back through a capacitor 74 to the non-inverting input, in order to obtain operation as a so-called chopper amplifier and provide regulation in on-off operation. This non-inverting input is also connected through a resistance 75 to the motor-side end of the resistance 71, while the inverting input of the operational amplifier 72 is connected to the tap 76 of a voltage divider 77,78, one end of which is connected to the negative voltage bus 37 and the other end 79 of which is connected to a suitable control magnitude. Since the current regulator 41 regulates the current in a manner not completely independent of the motor speed, the control magnitude at the terminal 79 is preferably a voltage that decreases with decreasing speed. The control magnitude at the terminal 79 can also be provided by a speed control circuit if the motor 10 is intended to operate at a steady or regulated speed, as for example is often desired in the case of fans if these are to operate at very high speed. A preferred speed regulation circuit for operation through such a current control circuit is illustrated in patent application No. 10773/79-6 filed Nov. 11, 1979, the content of which is expected to be published soon, said application being owned by the assignee of the present invention.

The output 73 of the operational amplifier 72 is connected through a resistor 80 with the stabilized voltage source and likewise the operational amplifier 72 itself. A large capacitor 81 (e.g. 100 uF) is connected in parallel with the voltage stabilizing circuit 39 for further stabilization.

It is usually undesired to have to provide two rotary position sensors 31 and 32 in a motor, and an effort is made to get along with only one sensor. FIGS. 4, 4A, 4B and 5 show how that can be done in accordance with the present invention. Parts which are identical or identical in function to parts in previously described figures are designated with the same reference numerals and generally not further described.

Figure 4A:
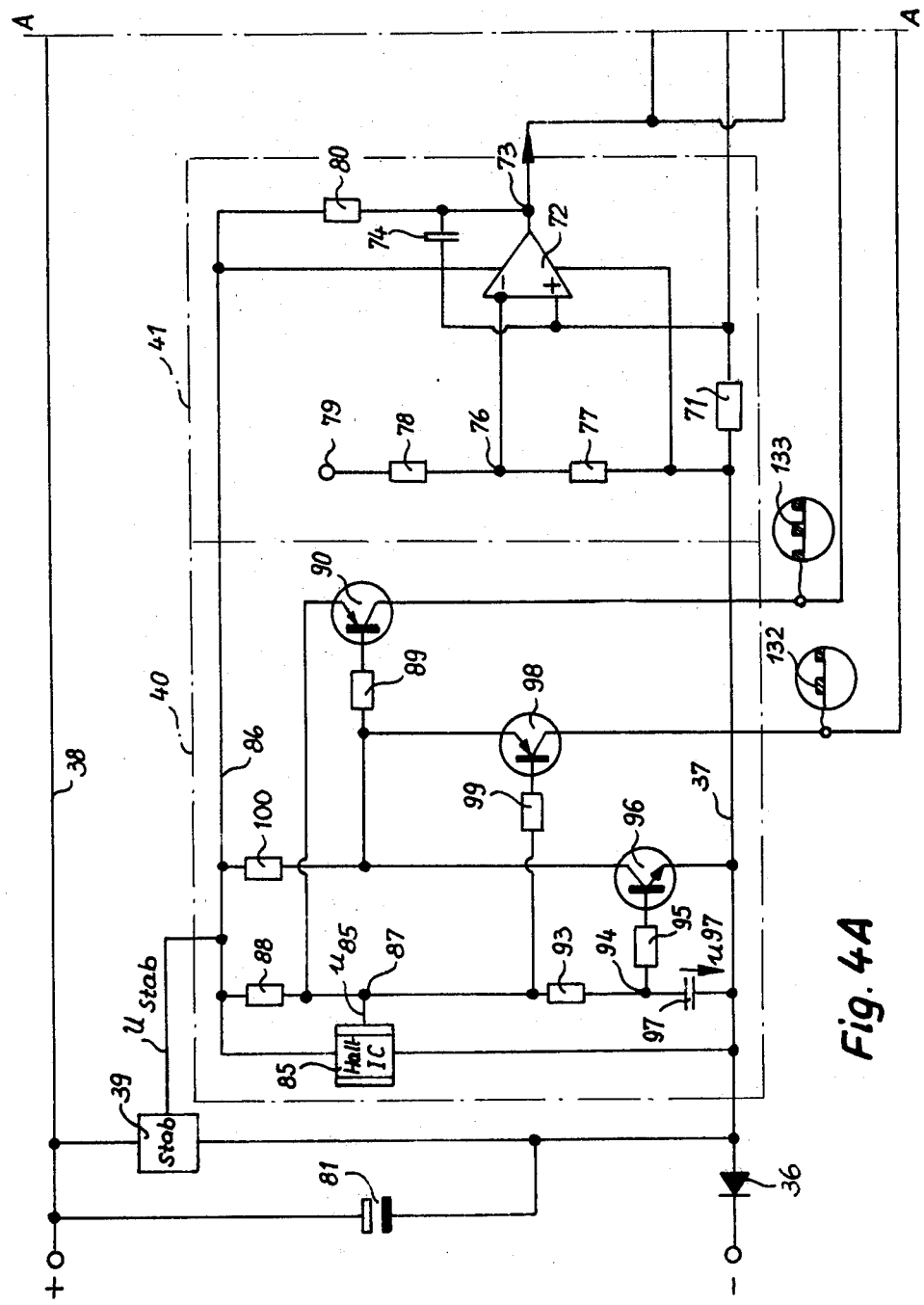
FIG. 4A is the pulse generator and logic circuit portion of a preferred embodiment of the invention.

FIG. 4 shows how FIGS. 4A and 4B go together to show the circuit in question. In FIG. 4A a Hall-IC 85, for example of type TL 170, is provided for generating essentially rectangular-shaped pulses having a keying ratio m of about 50%. This Hall-IC is located in the region of a slot opening of the stator 18, as in the case of the sensor 32 of FIG. 1 and responds to the magnetic field of the rotor 11. Since the amplification of the Hall-IC is relatively large, the signal $u_{85}$ at its output 87 has relatively steep flanks, as illustrated in line A of FIG. 5. The Hall-IC 85 is connected for current supply, as shown, to the negative voltage bus 37 and to a positive voltage line 86 fed by the stabilized voltage source of voltage $U_{stab}$.

A resistance 88 is connected between the output 87 and the positive line 86, a resistance 99 between the output 87 and the base of a pnp transistor 98 and a resistor 93 between the output 87 and a circuit node 94 that in turn is connected through a resistance 95 to the base of an npn transistor 96 and through a capacitor 97 with the negative voltage bus 37. The output 87 is also connected with the emitter of a pnp transistor 90, the base of which is connected through a resistance 89 with the emitter of the transistor 98, which in turn is connected with the collector of the transistor 96 and through a resistance 100 to the positive voltage line 86. The emitter of the transistor 96 is connected to the negative voltage bus 37.

The collector of the transistor 90 is connected to the base of an npn transistor 104 (FIG. 4B) and the collector of the transistor 98 is connected with the base of an npn transistor 105 (FIG. 4B). As shown in FIG. 4B, the transistors 104 and 105 serve for control of the bridge circuit that is collectively designated 106 and is provided with four power transistors 107, 108, 109 and 110. 107 and 108 are pnp transistors and 109 and 110 are npn transistors. The former each have their emitters connected to the positive voltage bus 38 and the latter have their emitters connected to a negative voltage bus 113 that is connected through the current measuring resistor 71 to the negative voltage bus 37. The collectors of the transistors 107 and 109 are connected together and to the terminal 28 of the stator winding 25, while the collectors of the transistors 108 and 110 are connected to the winding terminal 29. The reverse voltage bypass diodes 47 ... 50 are as shown connected in each case in parallel to the emitter-collector path of one of the individual power transistors. Resistors 104' and 105' are provided between base and emitter of transistors 104 and 105.

The bases of the individual transistors 107 ... 110 are respectively connected over resistors 114 ... 117 of, for example, 1 k ohms with the corresponding emitter. A resistance 118 leads from the base of the transistor 107 to the collector of the transistor 105, the emitter of which is connected to the base of the transistor 110, so that upon switching on of the transistor 105, the diagonally opposite power transistors 107 and 110 of the bridge circuit 106 become conducting. Likewise, a resistor 119 leads from the base of the transistor 108 to the collector of the transistor 104, the emitter of which is connected to the base of the transistor 109, so that upon switching on of the transistor 104, the diagonally opposite power transistors 108 and 109 become conducting and a corresponding current flows through the stator winding 25.

A resistance 122 leads from the output 73 of the current regulator 41 to the base of an npn transistor 123 and a resistance 124 leads from the same place to the base of an npn transistor 125. The collector-emitter path of the transistor 123 is interposed between the emitter of the transistor 104 and the negative bus 113 and the emitter-collector path of the transistor 125 is likewise interposed between the emitter of the transistor 105 and the negative bus 113. If, therefore, the transistors 123 and 125 are made conducting by a signal from the current regulator 41, they block the two power transistors 109 and 110, thus the lower half of the full bridge 106, but not the upper bridge half. This has the advantage as already explained in detail in connection with FIG. 2.

The commutation unit 40 operates as follows.

The output pulses $u_{85}$ of the Hall-IC 85 (see line A of FIG. 5) are directly supplied to the emitter of the transistor 90 and to the base of the transistor 98. These two transistors operate in the present case as conjunctive gates and in turn they control the two driver transistors 104 and 105 of the bridge circuit 106.

The output pulses $u_{85}$ of the Hall-IC 85 are also supplied to a delay circuit consisting of the resistor 93 and the capacitor 97. The voltage $u_{97}$ at the capacitor 97 controls the transistor 96. The voltage $u_{97}$ has, as shown in line B of FIG. 5, a delayed rise 130 and a delayed fall 131, so that the respective pulse sequences of lines A and B of FIG. 5, although of the same frequency, are offset from each other in time in the transition regions.

The voltage $u_{97}$ controls the voltage at the collector of the transistor 96, and the latter is supplied to the base of the transistor 90 and the emitter of the transistor 98, so that the logical correlation of the signals $u_{85}$ and $u_{97}$ takes place at these two transistors. For example, if at the moment $t_1$ the voltage $u_{85}$ is at a high value and the voltage $u_{97}$ is sufficiently high for the transistor 96 to be conducting, the base of the transistor 90 is connected to the negative line 37. In consequence the transistor 90 at this moment beomes conducting and in turn the driver transistor 104 becomes conducting and turns on the bridge transistors 108 and 109. This goes on until the moment $t_2$ at which the output signal of the Hall-IC 85 becomes low, as the result of which the transistor 90 blocks.

In the period from $t_1$ to $t_2$, the base of the transistor 98 is more positive than the corresponding emitter, so that this transistor blocks. It remains blocked until the moment $t_3$, because only at this moment does the voltage of the capacitor 97 fall far enough for the transistor 96 to block and for a voltage to appear at its collector which is more positive than the voltage $u_{85}$ which is low at this moment, so that only beginning with $t_3$ does the transistor 98 conduct and turn on the power transistors 107 and 110 through the driver transistor 105, and then it does this until the moment $t_4$ at which the voltage $u_{85}$ is again high, so that the transistor 98 again blocks. So long as the transistor 96 is blocked, the transistor 90 is also blocked, for then its base is more positive than the emitter.

Figure 5:
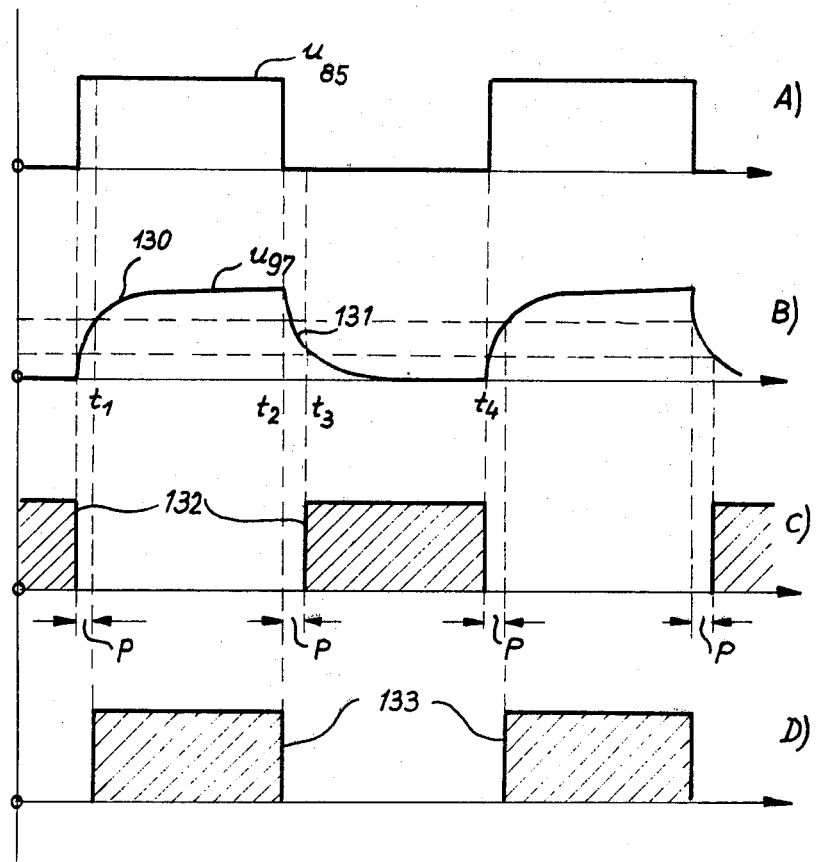
FIG. 5 is a timing diagram explaining the manner of operation of the embodiment of FIGS. 4, 4A and 4B

At the collector of the transistor 98, there is accordingly obtained the sequence of control pulses 132 illustrated on line C of FIG. 5, while at the collector of the transistor 90 there is obtained the sequence of control pulses 133 illustrated on line D of FIG. 5. An interpulse pause P lies in each case between successive-in-time pulses 132 and 133, so that every time the conducting pair of power transistors, e.g. 107 and 110, can block before the other two power transistors, e.g. 108 and 109, become conduct- In this manner, short-circuits in the power portion of the circuit are safely avoided.

Since the pulses 132, 133 comletely turn on the respective transistors of bridge circuit 106 each time, the currents in the bridge could rise above the permissible maximum, particularly in starting up the motor. These currents are accordingly measured at the resistor 71 in order to produce a response of the current regulator when a predetermined current level is exceeded, that response switching on the transistors 123 and 125 and, after a predetermined period, essentially set by the capacitor 74, switching them off again. In this manner, a current in the winding 25 is prevented from rising beyond a prescribed maximum value, and the power transistors 107 . . . 110 are assured of protection against overload.

The following are typical values for components of the commutation circuit unit 40 of FIG. 4A:

| | |
|---|---|
| Hall-IC 85 | TL 170 (Texas Instruments) |
| Resistors 88, 100 | 10 k ohms |
| Resistors 89, 99 | 100 k ohms |
| Resistors 93, 95 | 47 k ohms |
| Capacitor 97 | 22 nF |
| Transistors 90, 98 | BC 308 |
| Transistor 96 | BC 238 |
| Operating Voltage: 5 volts | |

The embodiment illustrated in FIGS. 4A and 4B shows particularly how it is possible with a single rotor position sensor to generate interleaved pulse sequences 132 and 133, the interleaved pulses of which are each separated at each pulse by an interpulse interval P, so that short-circuits in the bridge circuit 106 cannot occur and so that even in a two-winding motor, where the short-circuit question does not arise, the efficiency is improved and the development of noise producing disturbances is reduced because the current pulses of the stator do not overlap each other.

A supplementary current regulation, particularly in the case of motors of higher power and particularly the imposing of a maximum limit on current is a practical requirement. Motors according to the present invention have their preferred application for fans and blowers, particularly for the ventilation of machinery and electronic equipment that gives off heat. It should be further noted that the basic concepts of the embodiments illustrated in FIGS. 4A and 4B is to derive from a first signal having steep flanks a second signal with less steep flanks and then to combine both signals in logic correlation gates having a relatively high response threshold, so that the time offset of regions of the two signals leads to the desired result.

Regarding the operation of the circuit, it should be noted that the transistors 107 . . . 110 of the full bridge 106 are heavily driven in order that the power losses in these transistors may be kept as low as possible. It therefore takes a relatively long time to turn off a previously conducting transistor, while turning-on a previously blocked transistor takes place suddenly in response to the strong drive signal. The danger arises that one pair of transistors will already be turned on while the other pair has not yet been turned off. The pauses P (FIG. 5) accordingly serve to eliminate this risk and the utility of the invention accordingly extends to whenever a winding is driven by a full bridge circuit.

The blocking of a single half of the bridge (two adjoining transistors, one from each diagonal pair) by the transistors 123 and 125 has the following advantages compared to the blocking of the entire bridge 106. If the entire full bridge is blocked, the energy stored in the winding 25 is dissipated by the flow of current through the reverse current bypass diodes 47,48,49 and 50, back to the d.c. current source $U_{32}$, which in the case of a telephone central office, for example, would be the office battery. In repeated rapid energy releases of this type, pulse-like currents continually flow back and forth through the power supply line to the motor, for example a blower cooling a frame of apparatus, and these currents can induce undesired disturbance voltages in neighboring conductors.

If, on the other hand a full bridge is blocked only on one side, e.g. by blocking of the two lower transistors 109 and 110 of FIG. 4B, while the upper transistors 107 and 108 continue to be turned on in alternation, the energy stored in the winding 25 produces currents flowing through the reverse current bypass diode 48 and the transistor 107 or through the reverse current bypass diode 47 and the transistor 108, thus not back to the office battery. In this manner, undesired pulse-type currents are reduced in the connection leads of the motor and the relatively large capacitor 81 (e.g. 220 uF) further reduces the current pulsations in the connection leads, because it equalizes to a great extent the periodically fluctuating energy requirements of the motor 10.

Furthermore, the relatively low resistance in the described short-circuit path for the winding 25 results in low losses and produces only small voltage peaks and thus also low radio interference and low motor noise.

Figure 6:
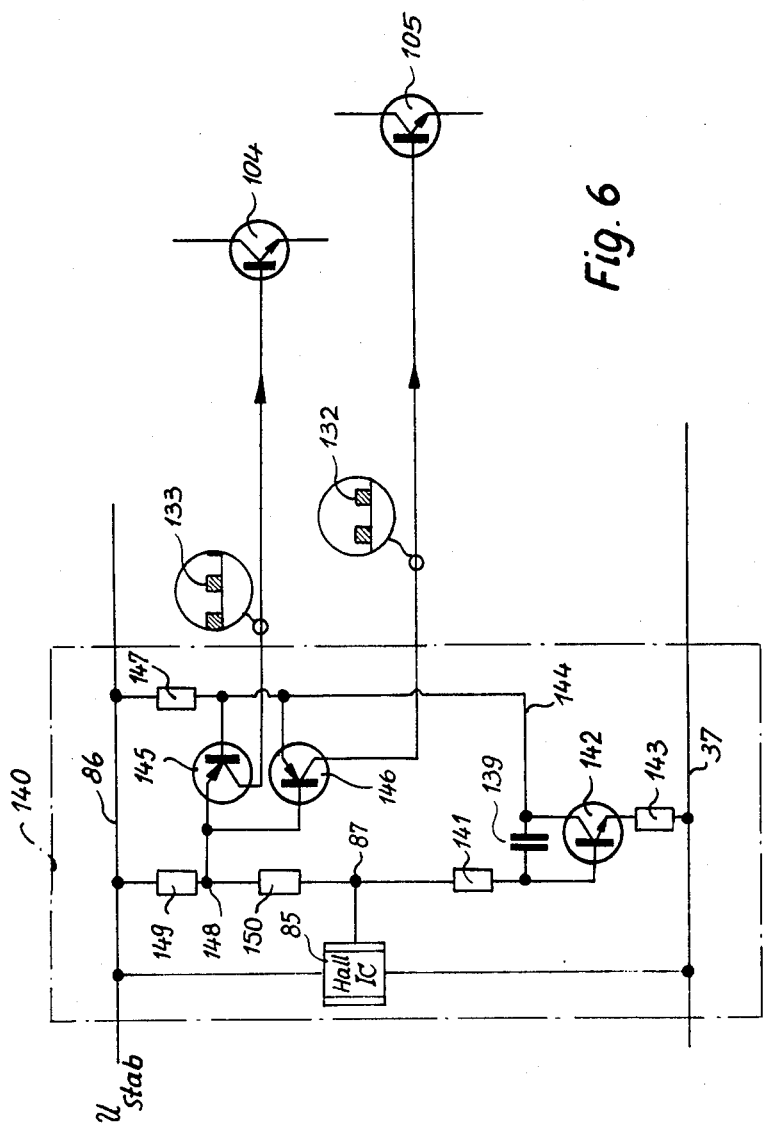
FIG. 6 is a circuit diagram of a preferred modification of the circuit of FIGS. 4A and 4B.

FIG. 6 shows a preferred modification of FIG. 4 concerning particularly the commutation circuit unit 40 of FIG. 4A. This unit is designated 140 in FIG. 6. Parts that are identical or identical in function with parts of FIG. 4A are designated with the same reference numerals in FIG. 6 and generally not further described.

In FIG. 6 a resistor 141 leads from the output 87 of the Hall-IC 85 to the base of an npn transistor 142 that is connected as a Miller integrator and hence has a capacitor 139 connected between its collector and its base. Its emitter is connected through a resistor 143 to the negative supply bus 37. Between the collector of the transistor 142 and the negative bus 37, there accordingly appears in operation a voltage that corresponds substantially to the voltage $u_{97}$ of FIG. 5B. This voltage is supplied over a conductor 144 to two pnp transistors 145 and 146, which serve as logic correlation elements (gates). In particular, the conductor 144 leads to the base of the transistor 145 and to the emitter of the transistor 146 and is also connected through a resistor 147 with the positive supply bus 86. The emitter of the transistor 145 and the base of the transistor 146 are likewise connected together and with a circuit node 148 which in turn is connected through a resistor 149 with the positive supply bus 86 and through a resistor 150 with the output 87 of the Hall-IC 85. The collector of the transistor 145 is connected to the base of the transistor 104 (FIG. 4B) and the collector of the transistor 146 with the base of the transistor 105 (FIG. 4B).

FIG. 6—Manner of Operation

The rectangular output signal (FIG. 5A) of the Hall-IC 85 is supplied to the transistor 142 constituted as a Miller integrator to generate at its collector a voltage that has about the form shown on line B of FIG. 5. This voltage is supplied to the transistors 145 and 146 and likewise the voltage that is offset in time in certain ranges appearing at the output 87, so that the transistors 145 and 146 are alternatingly conducting, with an interpulse pause P occurring every time between successive pulses 132, 133 as illustrated on lines C and B of FIG. 5.

Compared with the commutation unit 40 illustrated in FIG. 4A, the unit 140 has various advantages: the signals 132 and 133 have a greater amplitude and accordingly provide a more reliable switching of the transistors 105 and 104. Furthermore the capacitor 139 can be smaller than the capacitor 97.

Although the invention has been described with reference to particular illustrative embodiments, it will be understood that further variations and modifications are possible within the inventive concept.

Typical component values for the circuit 140 of FIG. 6 are:

| | |
|---|---|
| Hall-IC 85 | TL 170C |
| Resistors 147, 149 | 2.7 k ohms |
| Resistor 150 | 5.6 k ohms |
| Resistor 141 | 100 k ohms |
| Resistor 143 | 4.7 k ohms |
| Capacitor 139 | 1.5 nF |
| Transistor 142 | 5460 |
| Transistors 145, 146 | BC 556 |
| Operating voltage: 5 volts. | |

We claim:
1. A brushless d.c. motor having a permanent magnet rotor (11), a stator, conductor means (25) wound on said stator for energizing the stator by pulses of current, and rotor position sensing means (85) for controlling said current pulses so that in operation of said motor two current pulses are provided to said conductor means (25) for every 360° el. of rotation of said rotor, said sensing means (85) having an output providing an electrical signal having two output values between which it makes substantially instantaneous transitions at instants determined by rotor position, said motor further comprising, in accordance with the invention:

means (96,97;139,142) for subjecting said output signal ($u_{85}$) of said sensing means to phase reversal and delay and delivering a correspondingly modified signal at an output;

a pair of logic elements (90,98;145,146) to the respective inputs of which are applied said output signal of said sensing means and the output of said phase reversal and delay means, for producing logic stage output signals (132,133) at each of two outputs only when between said inputs of said logic elements there is a voltage difference of a predetermined polarity exceeding a predetermined minimum in magnitude, the logic stage output signals of one of said two outputs being separated in time from the logic stage output signals of the other of said two outputs by time gaps, and means (104,105, etc.) responsive to said respective logic stage output signals for controlling the provision of current pulses to said conductor means (25) wound on said stator.

2. A motor as defined in claim 1 in which said output signal of said sensing means (85) has a keying ration (m) of the order of magnitude of 50%.

3. A motor as defined in claim 1 in which said phase reversal and delay means are constituted as a Miller integrator (139,142) for providing output pulses which are inverted and delayed with respect to said two-valued output signal of said sensing means (85).

4. A motor as defined in claim 1, in which said means responsive to the respective logic stage output signals include a bridge circuit of semiconductor unidirectional switches for producing current pulses of alternating direction across a diagonal of the bridge circuit, and in which said conductor means wound on said stator are constituted by a single winding connected across said bridge circuit for energization by said current pulses of alternating direction.

5. A motor as defined in claim 4, in which a current regulator of the on-off type is provided for controlling only one of the bridge circuit halves for limiting the current through said semiconductor switches of said bridge circuit, and in which, further, each of said semiconductor switches of said bridge circuit is provided with reverse current bypass means (47–50).

6. A motor as defined in claim 1 in which said phase reversal and delay means are constituted by an inverter stage (96) at the input of which a delay network (93, 97) is provided.

7. A motor as defined in claim 1 in which said two logic elements of said logic stage are constituted by a pair of transistors of the same kind (90, 98; 145,146) to the inputs of which the outputs of said sensing means and of said phase reversal and delay means are made available, the emitter-base paths of the transistors of said pair being connected in anti-parallel manner to both said outputs, whereby the collectors of the transistors of said pair are made capable of delivering, respectively, interleaved sequences of current pulses (132,133) with time interval gaps (p) between the end of a pulse of one sequence and the beginning of a pulse of the other sequence.

8. A motor as defined in claim 7, in which said means responsive to pulses of said interleaved pulse sequences comprise semiconductor control devices (107–110) and in which at least one current regulator circuit (41) is provided for limiting the amplitude of the respective currents in said semiconductor device.

9. A motor as defined in claim 8, in which said current regulator circuit (41) is of the two-stage type.

10. A motor as defined in claim 7, in which said means responsive to pulses of said interleaved pulse sequences comprise semiconductor control devices (107–110) and in which at least one current regulator circuit (41) is provided for limiting the amplitude of the respective currents in said semiconductor device, and in which said motor has a stator with a monofillar winding and said semiconductor devices (107–110) are connected in a full bridge circuit, said current regulator circuit (41) being constituted for controlling only one of the two halves of said bridge circuit, and in which, further, reverse current by-pass devices (47–50) are associated with each of said semi-conductor devices (107–110).

11. A motor as defined in claim 7 in which said sensing means comprises a Hall-IC (85) operating as a rotor position sensor and a voltage divider (149,150) interposed between the output of said Hall-IC (85) and one terminal (86) of the energizing voltage source, and in which one terminal of the emitter-base-paths of said transistor pair (145,146) is connected directly with a tap (148) of said voltage divider.

12. A motor as defined in claim 7 in which a series input resistor (89,99) is provided in the base connection of each transistor (90,98) of said transistor pair having antiparallel emitter-base-paths.

13. A motor as defined in claim 7, equipped with blades for operation as a fan or blower and equipped with a casing having a motor-casing portion, in which said means responsive to pulses of said interleaved pulse sequences comprise semiconductor control devices (107–110) and in which at least one current regulator circuit (41) is provided for limiting the amplitude of the respective currents in said semiconductor device, said phase reversal and delay means, logic elements and said means responsive to said logic stage output signal being located in said motor casing portion of said casing.

14. A motor as defined in claim 1, in which said means responsive to said logic stage output signals for controlling the provision of current pulses comprise semiconductor control devices (107–110), and in which at least one current regulator circuit (41) is provided for limiting the amplitude of the respective currents in said semi-conductor devices.

15. A motor as defined in claim 14, in which said current regulator circuit (41) is of the two-state type.

16. A motor as defined in claim 7, in which said means responsive to said logic stage output signals for controlling the provision of current pulses comprise semiconductor control devices (107–110) and in which at least one current regulator circuit (41) is provided for limiting the amplitude of the respective currents in said semiconductor device, and in which said motor has a stator with monofilar winding means and said semiconductor devices (107–110) are connected in a full bridge circuit, said current regulator circuit (41) being constituted for controlling only one of the two halves of said bridge circuit, and in which, further, reverse current by-pass devices (47–50) are associated with each of said semiconductor devices (107–110).

17. A motor as defined in claim 1, equipped with blades for operation as a fan or blower and equipped with a casing having a motor-casing portion, in which said means responsive to said respective logic stage output signals comprise semiconductor control devices (107–110) and in which at least one current regulator circuit (41) is provided for limiting the amplitude of the respective currents in said semiconductor devices, said logic elements, phase reversal and delay means and means responsive to said respective logic stage output signals being located in said motor casing portion of said casing.

* * * * *